May 5, 1936. B. F. BIRD 2,039,768
VEGETABLE HYDRATING APPARATUS
Filed June 19, 1933 2 Sheets-Sheet 1
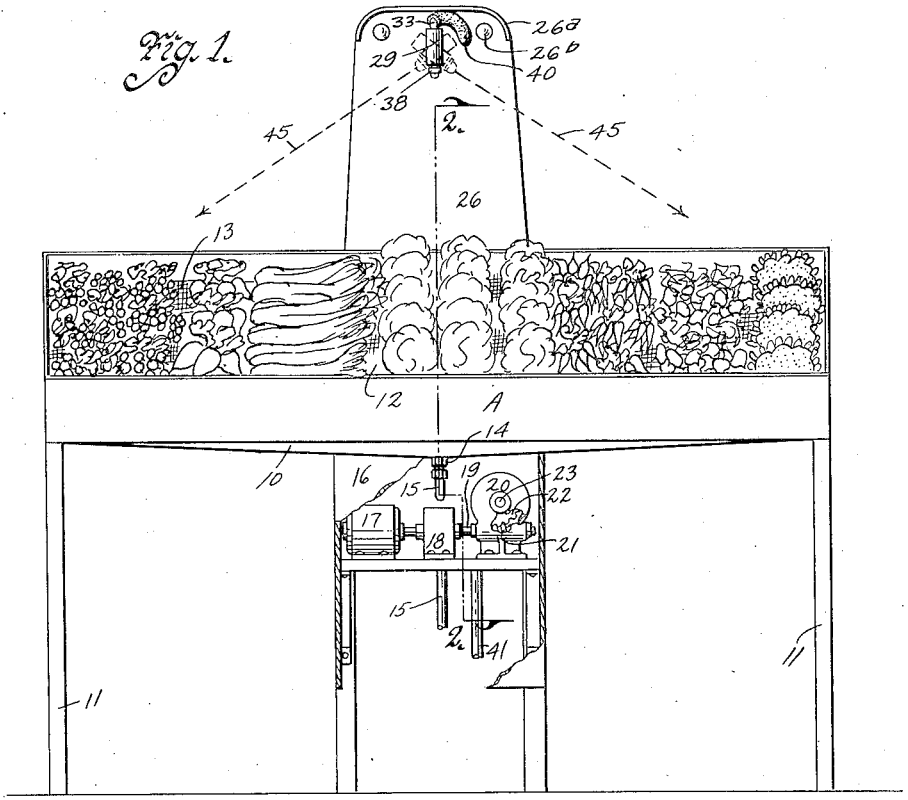
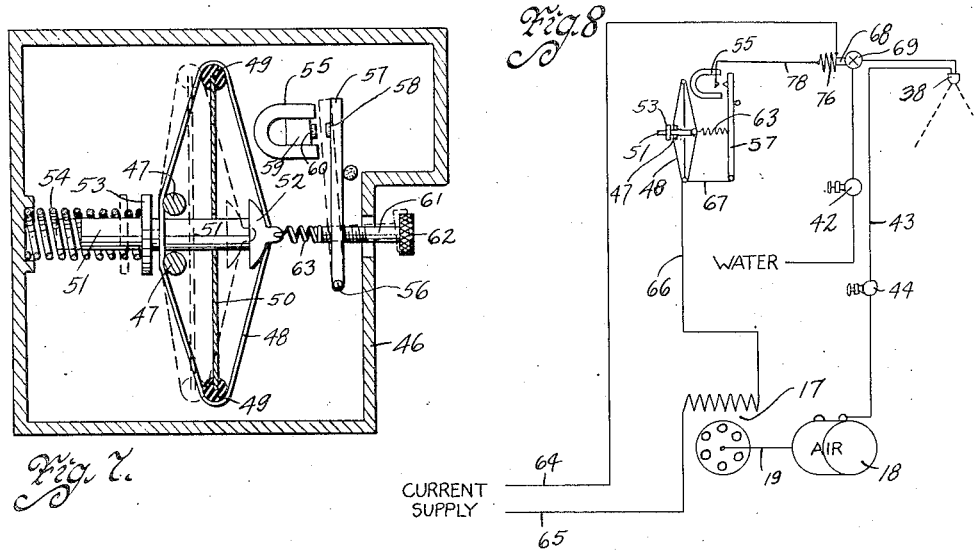
Witness
Edw. Seeley
Inventor
Benjamin F. Bird
By Bair, Freeman & Sinclair
Attorneys

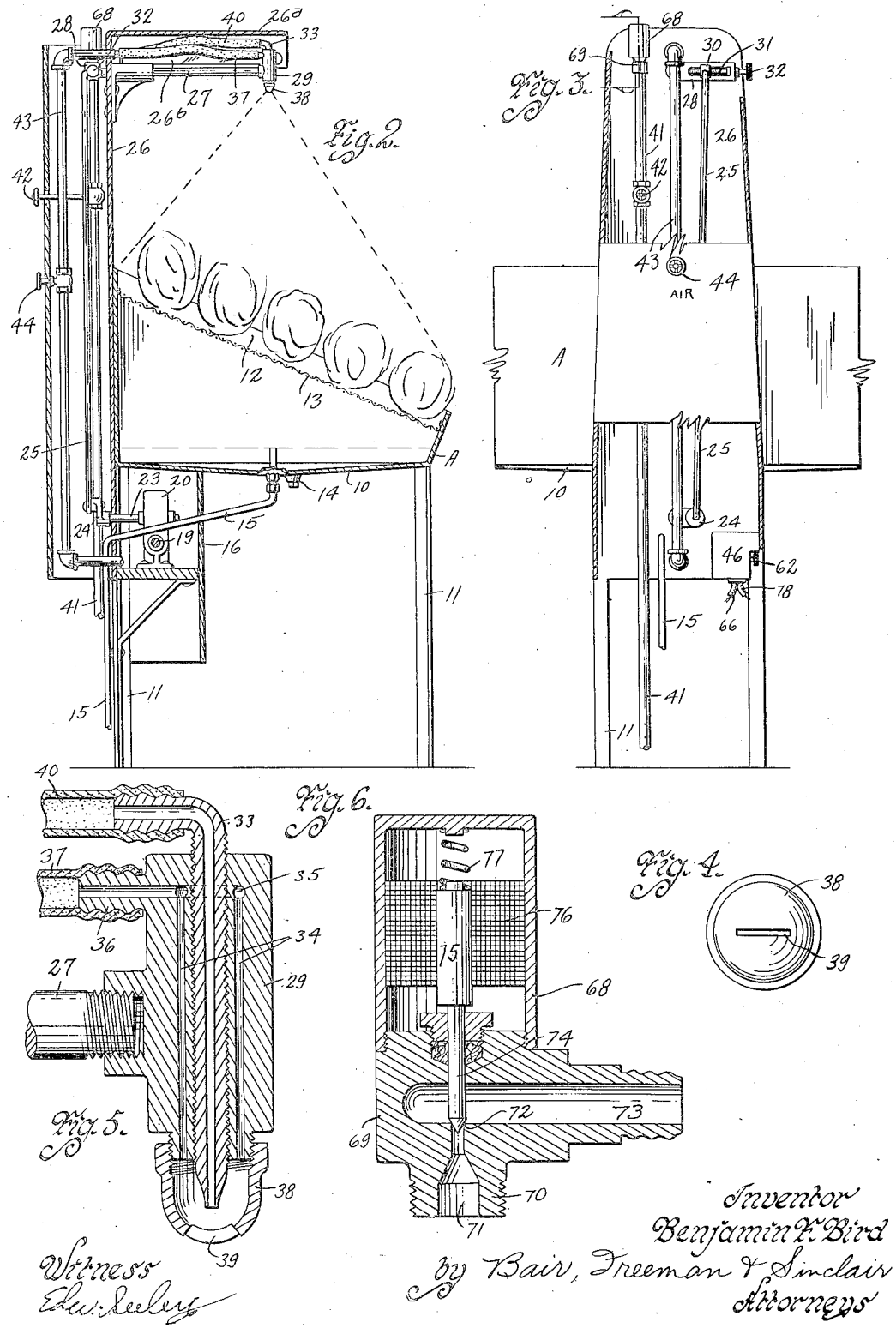

Patented May 5, 1936

2,039,768

UNITED STATES PATENT OFFICE 2,039,768

VEGETABLE HYDRATING APPARATUS

Benjamin F. Bird, Highland Park, Ill.

Application June 19, 1933, Serial No. 676,498

8 Claims. (Cl. 299—62)

The purpose of my invention is to provide a vegetable hydrating apparatus of simple, durable and inexpensive construction.

More particularly, it is my object to provide such a device having a nozzle for discharge of fine water vapor.

Another purpose is to provide a nozzle with means for reciprocating it.

Still another purpose is to provide novel mechanism for controlling the water spray as to air supply, water volume and time of operation.

Another object of my invention is to provide an improved method for hydrating vegetables.

With these and other objects in view, my invention consists in the construction, arrangement and combination of the various parts of my vegetable hydrating apparatus, whereby the objects contemplated are attained, as hereinafter more fully set forth, pointed out in my claims, and illustrated in the accompanying drawings, in which:

Figure 1 shows a front elevation of a vegetable hydrating apparatus involving my invention, parts being broken away and parts being shown in section.

Figure 2 is a vertical, sectional view taken on the line 2—2 of Figure 1.

Figure 3 is a rear elevation of part of the apparatus including the operating mechanism, parts being broken away and parts being shown in section.

Figure 4 is an end elevation of the nozzle.

Figure 5 is a vertical, sectional view of the nozzle.

Figure 6 is a vertical, sectional view of the solenoid valve, preferably employed for controlling the water flow through the nozzle.

Figure 7 is a detailed, sectional view of the casing for the heat actuated switch with the switch contained therein; and Figure 8 is a diagrammatic view of the device.

It is the common practice to display fresh vegetables in retail stores where the purchaser can see them. Owing to the rapid evaporation of moisture from root vegetables, the hydrating of such vegetables when on display has become so important as to be necessary.

Research by the Department of Agriculture has proven that the average green vegetable distributor suffers an annual loss of from 25% to 33⅓%, owing to the disintegration of vegetables placed on sale, especially during the spring, summer and fall months. A large part of this loss is due to evaporation of moisture from root vegetables.

The best protection against this evaporation is by providing a light spray or fine mist of water. Experiments show that a light film of water on the vegetables will not only keep them in their original growing condition, and in many instances will continue the natural growth, insure the preservation of the vegetable in its natural state, as though by means of rain or dew, and will even add to the normal moisture content.

Various devices have heretofore been tried for this purpose, but owing to their peculiar construction and to certain faults in their mode of operation have not been satisfactory. They furnish too much water in some areas and too little in other areas—with the result that rot is induced in some vegetables and over-evaporation permitted in others.

The present apparatus has been produced for the purpose of insuring the proper hydration of the vegetables and eliminating the difficulties experienced with previous devices. Additional advantages will appear from the following description and explanation.

In the accompanying drawings, I have used the reference character A to indicate generally a fresh vegetable display fixture. A tray or the like 10, made for instance of rust-proof metal, is supported by suitable legs 11.

These fixtures are preferably provided with removable vegetable holding trays 12 provided with foraminous bottoms 13. These trays are preferably also made of rust proof metal.

The bottom of the tray 10 is preferably slightly inclined to a drain plug 14, used only in case it is desired to remove all of the water from the tray 10.

An overflow drain pipe 15 is extended through the bottom and projects upward slightly above the bottom, so that normally some water is retained in the tray 10 in order that the vegetables may be subjected to the moisture of evaporation from below. The pipe 15 may be connected with the sewer or the like.

Operating mechanism

I provide suitable mechanism, including a reciprocating nozzle for discharging above the vegetable trays 12 a fine mist or spray of water.

I also provide means for intermittently stopping the spray so that there will not be an oversupply of water. The mechanism includes means for controlling the flow of water and controlling the flow of air to the nozzle.

Located in a suitable closed casing 16, preferably moisture proof, is a prime mover, such as the motor 17. The motor is connected in any suitable way with a compressor or pump 18 and from thence to a shaft 19 extending into the gear casing 20. On the shaft 19 is a worm 21 meshing with a worm wheel 22 from which projects the shaft 23 on which is a crank 24 connected with an upwardly extending pitman 25.

A casing 26 for the operative mechanism extends upwardly at the back of the fixture. Suitably journaled at the top of the casing 26 is a forwardly projecting rock shaft 27. The upper end of the pitman 25 is connected with the rock shaft as by means of an arm 28. The rock shaft 27 carries the nozzle 29 and the nozzle is thereby reciprocated so as to discharge the water evenly, as indicated for instance by the dotted lines in Figure 1, over all of the trays 12. The arc through which the shaft 27 and the nozzle 29 reciprocate may be regulated in any suitable way. Thus the mechanism may be used with displays of different lengths.

I have shown as an illustration a block 30 slidably mounted in the arm 28 and adjusted on a threaded rod 31, which extends through it and is journaled in the block. On the rod 31 is a knurled nut 32 for convenience in making this adjustment.

It will, of course, be understood that the adjustment could be located at the lower end of the pitman 25 or elsewhere as might be desired.

Nozzle

In Figure 5, I have shown in detail, the nozzle which I employ in my hydrating device.

A water discharge tube 33 is threaded lengthwise through the entire nozzle as shown. Spaced from the tube 33 on each side thereof is an air passage 34. One or more of these passages may be provided, and they may be of any suitable size or shape, but I preferably employ one on each side of the tube 33 as shown. At the upper end of the passages 34, they connect with the common passage 35, which communicates in turn through a nipple 36 formed on the nozzle with an air supply pipe 37, hereafter referred to.

Screwed onto the lower end of the nozzle 29 is a discharge member 38, which is hollow and cup-shaped, as shown, with its lower interior having generally the shape of a portion of the surface of a sphere. In the lower end of the discharge member 38 is a narrow slot 39 elongated as shown. The long axis of this slot is in the vertical plane of the two air passages 34 as illustrated.

The upper end of the water tube 33 communicates by means of a flexible pipe 40, which may be similar to the flexible pipe 37, with a water supply pipe 41 leading from any source of water under pressure.

In the water pipe 41 is a needle valve control 42.

The flexible air pipe 37 connects in turn with an air pipe 43 extending downwardly through the casing 26 and suitably connected with the discharge of the compressor 18. In the pipe 43 is a suitable control valve 44.

It will be seen from the foregoing description that when the motor 17 is running, the pump 18 will be operated for furnishing air through the pipe 43 and pipe 37 to the passages 34 of the nozzle. At the same time, water is supplied to the nozzle. The water supply must be kept down, so that the spray shall be as nearly in the form of a fog or very fine mist as possible.

When the motor is running, it likewise operates the rock shaft 27 for reciprocating the nozzle, so that the spray is directed from one end to the other of the display unit. The extreme positions of spray discharge are indicated by the dotted lines 45 in Figure 1.

I have found that even when a very fine mist or fog is delivered from the nozzle, better results are obtained if the discharge is not continuous but is intermittent. I have therefore provided means for intermittently starting and stopping the motor and thus intermittently discharging the spray. This means includes a heat control motor or switch illustrated in Figure 7.

The casing 46 is located at any suitable point. Within the casing, I provide a heat-controlled switch, comprising a pair of rigid transverse rods 47. A series of wires 48 are extended around spaced insulating spools 49, which in turn are connected by a plate 50. As will be seen from the showing in Figure 7, these wires are arranged roughly in the form of an ellipse. At one side, they are secured to the rods 47. A rod 51 suitably supported extends between the rods 47 as shown and has on one end a cross head 52, which bears against the inner sides of the wires 48. On the rod 51 spaced from the wires 48 at normal temperatures is a collar 53. Between the collar 53 and the wall of the casing 46 is a coil spring 54, which normally tends to force the rod 51 to the right when the device is viewed as shown in Figure 7 and to press the cross head 52 against the inside of the wires 48 as shown.

At normal temperatures, the wires 48 are contracted and assume about the position shown in dotted lines in Figure 7. Suitably mounted in the casing 46 is a horse shoe magnet 55. Pivotally mounted as at 56 is an armature bar 57, which carries a contact 58. Preferably mounted within the magnet 55 is a block 59. A contact 60 is adjustably carried by the block 59.

The contact 60 is adjustably mounted so that it may be moved to various positions with relation to the magnetic field for thus controlling the operation of the magnet.

A threaded rod 61 is screwed into the armature 57 and projects freely through the wall of the casing 46 and has on its outer end a knurled head 62.

A coil spring 63 is interposed between the cross head 52 and the inner end of the rod 61.

In Figure 8, I have shown in diagrammatic form the manner of connecting up the heat actuated switch and the other parts of the mechanism.

The current supply wires 64 and 65 leading from any suitable source of current supply are used. The wire 65 extends to the motor 17 already mentioned. From the motor a wire 66 conducts current to and through the wires 48. A wire 67 extends from the wires 48 and is connected electrically to the armature 57.

In the water supply line 41 is an ordinary solenoid valve 68 illustrated in greater detail in Figure 6. The valve 68 includes a fitting 69, the lower end of which has a nipple 70 connected with the pipe 41. A pipe 71 leads into the fitting 69 from the pipe 41 and has at its upper part the valve seat 72. A passage 73 extends from the valve seat 72 to the flexible tube 40. A valve 74 cooperates with the seat 72. The valve 74 is carried by the core 75 of the solenoid 76. A spring 77 normally tends to hold the valve 74 seated. When, however, the solenoid is energized, the core will be withdrawn for opening the valve and permitting water flow.

The contact 60 is connected in circuit by a wire 78 with the winding of the solenoid 76 and thence to the current supply wire 64.

*Operation*

I will now describe in greater detail the operation and additional advantages of my hydrator.

When the main current supply switch, not shown, is turned on, then if the heat actuated switch is at a normal temperature, the wires will be in their contracted position, shown by dotted lines in Figure 7, and the spring 63 will hold the armature 57 against the poles of the magnet 55. The circuit is thus closed through the motor. The motor operates the air pump or compressor for supplying air through the nozzle.

The energizing of the solenoid 76 when the circuit is closed opens the valve 74 and permits water to likewise flow to the nozzle for discharging a fine spray therefrom.

The operation of the motor also serves to rock the shaft 27 for effecting the reciprocation of the nozzle.

The wires 48 heat slowly and as they heat they expand. The expansion of the wires 48 permits the spring 54 to force the rod 51 to the right. This compresses the spring 63 and when the tension of this spring reaches a certain point, the magnet 55 releases the armature 57, which snaps away and thus breaks the circuit. The wires 48 then cool off and contract and as they contract, they pull the cross head 52 to the left and again tension the spring 63 for pulling the armature toward the magnet poles. When the armature reaches a certain point in the magnetic field, it is snapped against the magnet poles, and the circuit is again closed.

By means of the rod 61 and by means of its construction, the heat actuated switch can be made to make and break the circuit at the desired intervals. For example, the spray can be turned on for one minute and off for two minutes, and these periods of time may be varied as desired and in accordance with the reqirements of the vegetables.

It will, of course, be obvious that the means for operating the device intermittently may be modified or may be omitted entirely. It may be desirable to arrange the device so that the heat actuated switch can be cut out of the circuit for instance under certain conditions of humidity and temperature.

It is also obvious that other means than the solenoid valve here shown might be employed for regulating the water supply.

A very important feature of my invention lies in the provision of means for supplying the water in a fanshaped spray and in reciprocating this spray. I have found that by providing such a spray and means for reciprocating it, I am able to give a more uniform supply of moisture to the vegetables and to cover the entire area of the vegetable containing trays so as to afford the right amount of moisture to all of the vegetables and avoid an oversupply in some places and an undersupply in other places.

The peculiar shape of the nozzle, especially of the slot 39, the interior of the member 38, and the manner of discharging the water and the air at the nozzle, enable me to secure the desired flat fanshaped spray.

It will also be noted that the arrangement of the pipe 15 projecting up into the tray 10 provides a supply of water below the vegetables, so that these vegetables may have the benefit of the moisture of evaporation from such water.

The advantages of a structure of the kind here described may be largely seen from the foregoing description. Such a device has great value in the handling of green vegetables by the retailer. He eliminates the very substantial loss to which he would otherwise be subjected by reason of evaporation of the moisture in the vegetables. The vegetables are maintained fresh and as nearly as possible in their condition when taken from the ground.

The unsanitary results of excessive moisture are avoided.

Another great advantage arises from what may be called the eye appeal to the purchaser. Vegetables when kept moist in the manner herein explained have a much better appearance as well as being actually in much better condition than where no such moisture supply is afforded.

The Department of Agriculture has ascertained that retailers using even the inadequate present day methods of hydrating their fresh vegetables have increased their sales of these goods in some instances from fifty to seventy-five percent over their competitors who were not protecting their vegetables in any such manner.

The particular mechanism herein described is shown for illustrating a form in which my invention may be embodied, and it will be clear from my explanation that many modifications might be made in the construction and arrangement of the various parts of my device, and in the manner of combining them together, and it is my purpose to cover by my claims any modifications in structure, material or arrangement which may be included within the scope of my invention.

My device is primarily designed and adapted for hydrating fresh vegetables on display or sale in retail grocery stores or similar establishments.

I claim as my invention:

1. In a hydrating apparatus, a display stand for vegetables and the like, oscillatable spray means for delivering a uniform mist-like spray over the contents of the stand from one end thereof to the other, water feeding means leading to said spray means, air impelling and conducting means arranged to deliver air under pressure to said spray means, intermittently operated driving mechanism arranged to drive said air impelling means and oscillate said spray means, valve means controlling the flow through said water feeding means, and control means governing the intermittent operation of said driving mechanism and arranged for intermittently causing said valve means to be actuated to shut off periodically the supply of water to the spray means so as to prevent too much water from being sprayed on the contents of the stand.

2. In a hydrating apparatus, a display stand for vegetables and the like, oscillatable spray means for delivering a uniform mist-like spray over the contents of the stand from one end thereof to the other, water feeding means leading to said spray means, air impelling and conducting means arranged to deliver air under pressure to said spray means, intermittently operated driving mechanism arranged to drive said air impelling means and oscillate said spray means, valve means controlling the flow through said water feeding means, and control means governing the intermittent operation of said driving mechanism and arranged for intermittently causing said valve means to be actuated to shut off periodically the supply of water to the spray means so as to prevent too much water from being sprayed on the contents of the stand, said spray means including an oscillatory spray nozzle supported substantially centrally of the stand and sufficiently high to spray the contents of the stand from one end thereof to the other.

3. In a hydrating apparatus, a display stand for vegetables and the like, oscillatable spray means for delivering a uniform mist-like spray over the contents of the stand from one end thereof to the other, water feeding means leading to said spray means, air impelling and conducting means arranged to deliver air under pressure to said spray means, intermittently operated driving mechanism arranged to drive said air impelling means and oscillate said spray means, valve means controlling the flow through said water feeding means, and control means governing the intermittent operation of said driving mechanism and arranged for intermittently causing said valve means to be actuated to shut off periodically the supply of water to the spray means so as to prevent too much water from being sprayed on the contents of the stand, the water from said feeding means and the air under pressure being expelled from said spray means in such proximity that the water is substantially atomized.

4. In a hydrating apparatus, a display stand for vegetables and the like, oscillatory spray means constructed and arranged to spray the contents of said stand, said spray means including an atomizing nozzle, means for delivering water to said nozzle, air compressing means, delivery means connecting said air compressing means and said nozzle, valve means controlling the flow through the water delivery means, and automatic timing control means arranged to periodically operate both said valve means and said air compressing means contemporaneously.

5. In a hydrating apparatus, a display stand for vegetables and the like, oscillatable spray means including an atomizing nozzle positioned to spray the contents of said stand substantially from one end thereof to the other, means for delivering water to said nozzle, valve means controlling the flow through said water delivery means, air compressor means, delivery means connecting said air compressor means and said nozzle, driving means arranged to drive said compressor means and oscillate said spray means, and automatic timing control means arranged to periodically start and stop all moving parts and accordingly open and close said valve means.

6. In a hydrating apparatus, a display stand for vegetables and the like, said stand having a water-retaining chamber beneath the contents of the stand, oscillatable spray means, means to deliver water to said spray means, valve means controlling said water delivery means, mechanism to compress air and deliver air under pressure to said spray means, driving means to operate said mechanism and oscillate said spray means, and automatic timing control means arranged to periodically stop all moving parts and move said valve means to closed position.

7. In a hydrating apparatus, a display stand for vegetables and the like, said stand having a water-retaining chamber beneath the contents of the stand, spray means positioned to spray the contents of said stand with a water mist, supply means to deliver water to said spray means, supply means to deliver gas under pressure to said spray means, and automatic timing control means arranged to periodically cut off both said supply means.

8. In a hydrating apparatus, a display stand for vegetable matter, spray means arranged to spray the contents of said stand substantially from one end of said contents to the other, fluid delivery means leading to said spray means, valve means controlling the fluid supply to said spray means, and automatic control means arranged to periodically actuate said valve means so as to cause to be delivered to the vegetable matter on the stand certain amounts of water consistent with the ability of such vegetable matter to absorb the same.

BENJAMIN F. BIRD.